2,937,111

METHOD OF REMOVING ORGANIC SURFACE COATINGS

Gene L. Leithauser, Oak Park, Mich., assignor to General Motors Corporation, Detroit, Mich., a corporation of Delaware No Drawing. Application February 26, 1958
Serial No. 717,540

10 Claims. (Cl. 134—38)

This invention relates to the removal of surface coatings such as paints, varnishes and lacquers and more particularly to the removal of plural organic coatings such as an alkyd resin base primer coated with an acrylic base lacquer.

In the provision of surface finishes for automobile bodies and the like, it is conventional practice to first apply a synthetic resin base paint or primer and subsequently to apply a suitable lacquer top coat over the primer. The former is applied because of its good adhesion to the metal or base surface to be coated, it permits removal of rough or machine surfaces after the application thereof and it provides corrosion resistance to the base metal. The lacquer top coat provides resistance to atmospheric elements as well as a glossy, attractive appearance.

Suitable primers may include a pigment, a suitable synthetic resin and a solvent in suitable proportions as is well known in the art. Examples of suitable synthetic resins for use in primers include alkyd resins, epoxy resins, oleoresins, nitrocellulose, cellulose acetate and suitable combinations of these and similar materials. Examples of suitable solvents include toluol, xylol, butanol, and similar alcohols and aromatic hydrocarbons. Suitable lacquer top coat materials, well known in the art, may consist of a suitable synthetic resin, a solvent, a plasticizer, a diluent and a dye or pigment in suitable proportions. Examples of suitable synthetic resins for use in lacquers include nitrocellulose, cellulose acetate, or an acrylic resin such as polymethyl methacrylate. Suitable solvents may include materials, such as amyl acetate, butyl acetate, ethyl acetate, methyl isobutyl ketone, amyl propionate, butyl lactate, cyclohexanol acetate or glycol monoethyl ether. Suitable plasticizers may include diethylphthalate, dibutylphthalate, diamylphthalate, tricresyl phosphate, tributylphthalate, butylstearate, and dioctylphthalate. Suitable diluents, which are nonsolvents miscible with the solvent and added in amounts insufficient to cause precipitation of the resin, include toluene, benzene and petroleum napthas such as toluol and xylol. Cellulose nitrate or acetate base lacquers may include resin modifiers such as an alkyd or vinyl resin. Similarly acrylic base lacquers may include resin modifiers such as cellulose acetate or cellulose nitrate. A typical acrylic base lacquer may consist of polymethyl methacrylate of polymethacrylate resin, a cellulose nitrate modifier, a dioctylphthalate plasticizer and methyl isobutyl ketone and ethyl acetate solvents.

In various industrial operations it is frequently necessary to remove plural coatings of the type described above and it is highly desirable in view of economy and efficiency that the coatings be removed simultaneously and in a single operation.

It is the basic object of the present invention to provide a method of removing plural organic coatings involving different synthetic resins and particularly a method of removing plural organic coatings wherein the primer has a base of synthetic resin such as an alkyd resin, an epoxy resin, nitrocellulose, cellulose acetate, oleoresin or a combination of these materials, and the top coat is an acrylic resin lacquer. In general, the method involves dipping the coated part in a solution maintained at about 70° to 340° F. which consists of from 93 to 98 parts by weight of a monohydroxy benzene such as cresol, 1.5 to 5 parts by weight of orthophosphoric acid (85% solution by weight) and 0.5 to 2 parts by weight of a wetting agent.

A preferred solution for use in the method of the present invention consists of 95 to 97.5 parts cresol, 2 to 4 parts of orthophosphoric acid (85% solution by weight) and 0.5 to 1 part of a wetting agent.

The preferred monohydroxy benzenes for use in the present invention include phenol, orthocresol, metacresol, paracresol or cresylic acid, a mixture of the aforementioned cresols. Mixtures of any of these materials may be used.

The phosphoric acid referred to its preferably orthophosphoric acid. However, any of the phosphoric acids including pyrophosphoric acid and metaphosphoric acid may be used since in solution these acids tend to pass into orthophosphoric acid. For convenience, it is preferred to use the commercially available 85% by weight aqueous solution of orthophosphoric acid.

The wetting agent may be any of a number of compounds which by their chemical and physical nature are wetting agents and contain one or more hydrophobic groups having bonded thereto a chain of about 8 or more successive carbon atoms wherein one or more of the carbon atoms may be replaced by multi-valent non-metals other than nitrogen or oxygen. A class of compounds suitable for use as wetting agents in accordance with the present invention are the quaternary salts wherein the cation is based on nitrogen, phosphorous or antimony and wherein the hydrophobic group may be attached directly or indirectly to the quaternary atom through non-ionic linkages or may be resident in the anion or both. The quarternary ammonium compound wherein the cation is based on nitrogen has been found particularly effective for use in the paint stripping composition of the present invention. Various examples of these compounds are disclosed in the United States Patents 2,334,709, 2,626,877, and 2,759,975. A specific quaternary ammonium salt which has been found particularly effective is stearamidopropyldimethyl-B-hydroxyethyl-ammonium dihydrogen phosphate available commercially as "cationic SP" (American Cyanamid Company). Another wetting agent of a different type which has also been found particularly effective for use in the present invention is perfluorocaprylic acid.

Each of the components involved in the above solution is essential to a successful removal of plural coatings having synthetic resin base primers and acrylic lacquer top coats. The following examples illustrate the practice of the invention.

Example I

A solution was prepared having the following composition by weight: 96.5 parts cresylic acid, 3.0 parts orthophosphoric acid (85% solution by weight), 0.5 part "cationic SP" wetting agent.

An approximately 8 millimeter film thickness of a plural coating of an alkyd resin base primer and a polymethyl methacrylate resin base lacquer on a metal sheet was entirely removed from the metal by immersing the coated metal sheet in the solution for one minute at 320° F. and thereafter rinsing the metal sheet in water. The coating was removed from another test sample in 15 minutes at 200° F.

Example II

A solution was prepared having the following composition by weight: 96.5 parts phenol, 3.0 parts orthophosphoric acid (85% solution by weight), 0.5 part "cationic SP" wetting agent.

An approximately 8 millimeter film thickness of a plural coating of an alkyd resin base primer and a polymethyl methacrylate resin base lacquer on a metal sheet was entirely removed from the metal by immersing the coated metal sheet in the solution for one minute at 320° F. and thereafter rinsing in water. The coating was removed from another test sample in 15 minutes at 200° F.

*Example III*

A solution was prepared having the following composition by weight: 94 parts cresylic acid, 5.0 parts orthophosphoric acid (85% solution by weight), 1.0 part "cationic SP" wetting agent.

An 8 millimeter film thickness of a plural coating of an alkyd resin base primer and a polymethyl methacrylate resin base lacquer on a metal sheet was entirely removed from the metal by immersing the coated metal sheet in the solution for one minute at 320° F. The coating was removed from another test sample in 15 minutes at 200° F.

*Example IV*

A solution was prepared having the following composition by weight: cresylic acid 93 parts, orthophosphoric acid (85% solution by weight) 6.0 parts, wetting agent "cationic SP" 1.0 part.

An 8 millimeter film thickness of a plural coating of an alkyd resin base primer and a polymethyl methacrylate resin base lacquer on a metal sheet was entirely removed from the metal sheet by immersing the coated sheet in the solution for 1½ minutes at 320° F. The coating was removed from another test sample in 18 minutes at 200° F.

*Example V*

A solution was prepared consisting as follows by weight: cresol 96.5 parts, orthophosphoric acid (85% solution by weight) 3.0 parts, and 0.5 part perfluorocaprylic acid.

An 8 millimeter film thickness of a plural coating of an epoxy resin base primer and a polymethacrylate resin base lacquer on a metal sheet was entirely removed from the metal sheet by immersing the coated sheet in the solution for one minute at 320° F. The coating was removed from another test sample in 15 minutes at 200° F.

*Example VI*

A solution was prepared as follows by weight: cresol 98 parts, orthophosphoric acid (85% solution by weight) 1.5 parts, "cationic SP" wetting agent 0.5 part.

An 8 millimeter film thickness of a plural coating of an alkyd resin base primer and a polymethyl methacrylate resin base lacquer on a metal sheet was entirely removed from the metal sheet by immersing the coated sheet in the solution for two minutes at 320° F. The coating was removed from another test sample in 25 minutes at 200° F.

A test sample such as was involved in Example I dipped into a solution consisting of 99 parts cresol, 0.05 part "cationic SP," 0.95 part orthophosphoric acid (85% solution by weight), maintained at 320° F. did not effect complete removal after one half hour. As indicated above, phosphoric acid is preferably maintained at not more than 5.0 parts orthophosphoric acid (85% solution by weight) so as to avoid adverse effects of the acid on the metal base material.

The aforementioned solutions have been found effective in removing the plural coatings described in a broad temperature range of 70° F. to 340° F., a rate of removal being more rapid with increased temperatures. Solutions wherein any of the constituents are omitted are ineffective in the removal of coatings including acrylic resin lacquers. No known solutions of the prior art were found to be effective in removing coatings of the type described. As indicated in the above examples, a solution containing about 96.5 parts of cresol, about 3.0 parts of orthophosphoric acid (85% solution by weight), and 0.5 part of a wetting agent consisting of "cationic SP" or perfluorocaprylic acid has been found most effective.

It is to be understood that, although the invention has been described with specific reference to particular embodiments thereof, it is not to be so limited since changes and alterations therein may be made which are within the full intended scope of this invention as defined by the appended claims.

I claim:

1. In a method of removing synthetic resin protective coatings the steps of immersing the work in a solution comprising by weight about 93.0 to 98.0 parts of a material selected from the group consisting of phenol and cresol, about 1.5 to 5.0 parts of orthophosphoric acid (85% solution by weight) and about 0.5 to 2.0 parts of a wetting agent, retaining the work in said solution for a time sufficient to loosen said coating, and removing said work.

2. In a method of stripping synthetic resin protective coatings the steps of immersing the work in a solution comprising by weight about 95 to 97.5 parts of a material selected from the class consisting of phenol and cresol, about 2 to 4 parts of orthophosphoric acid (85% by weight solution) and about 0.5 to 1.0 part of a wetting agent, retaining the work in said mixture for a time sufficient to loosen said coating, and removing said work.

3. Claim 1 wherein the temperature of the mixture is maintained between 70° F. and 340° F. and said wetting agent is a quaternary ammonium salt.

4. Claim 2 wherein the temperature of the mixture is maintained between 70° F. and 340° F. and said wetting agent is a quaternary ammonium salt.

5. Claim 1 wherein the temperature of the mixture is maintained between about 70° F. and 340° F. and the wetting agent is stearamidopropyldimethyl-$\beta$-hydroxyethylammonium dihydrogen phosphate.

6. Claim 1 wherein the temperature of the solution is maintained between 70° F. and 340° F. and the wetting agent is perfluorocaprylic acid.

7. Claim 2 wherein the temperature of the solution is maintained between 70° F. and 340° F. and the wetting agent is stearamidopropyldimethyl - $\beta$-hydroxyethylammonium dihydrogen phosphate.

8. Claim 2 wherein the temperature of the solution is maintained between 70° F. and 340° F. and the wetting agent is perfluorocaprylic acid.

9. In a method of removing synthetic resin protective coatings the steps of immersing the work in a solution comprising of about 96.5 parts cresol, about 3.0 parts orthophosphoric acid (85% solution by weight) and about 0.5 parts stearamidopropyldimethyl-$\beta$-hydroxyethylammonium dihydrogen phosphate, retaining the work in said solution for a time sufficient to loosen the coating and removing the work.

10. In a method of removing synthetic resin protective coatings the steps of immersing the work in a solution comprising of about 96.5 parts cresol, about 3.0 parts orthophosphoric acid (85% solution by weight) and about 0.5 part perfluorocaprylic acid, retaining the work in said solution for a time sufficient to loosen the coating and removing the work.

References Cited in the file of this patent

UNITED STATES PATENTS

| | | |
|---|---|---|
| 2,242,106 | Buckman | May 31, 1941 |
| 2,334,709 | Katzman | Nov. 23, 1943 |
| 2,525,178 | Miller | Oct. 10, 1950 |
| 2,626,877 | Carnes | Jan. 27, 1953 |
| 2,759,975 | Chiddix | Aug. 21, 1956 |